United States Patent [19]

Eccles et al.

[11] 3,723,768

[45] Mar. 27, 1973

[54] SEMI-CONDUCTOR DEVICES

[75] Inventors: Arnaud Michael Eccles; Norman Leonard Potter, both of Stafford, England

[73] Assignee: The English Electric Company Limited, London, England

[22] Filed: Jan. 12, 1966

[21] Appl. No.: 520,206

[30] Foreign Application Priority Data

Jan. 21, 1965 Great Britain.......................2,710/65

[52] U.S. Cl................................307/252 L, 307/311

[51] Int. Cl...............................................H03k 17/60

[58] Field of Search......307/311, 239, 296, 318, 305, 307/252

[56] References Cited

UNITED STATES PATENTS

| | | | |
|---|---|---|---|
| 2,935,623 | 5/1960 | Van Overbeck | 307/311 |
| 3,135,876 | 6/1964 | Embree | 307/252 |
| 3,171,074 | 2/1965 | Momberg | 307/318 |
| 3,226,625 | 12/1965 | Diebold | 307/248 |
| 3,233,120 | 2/1966 | Darke | 307/318 |
| 3,267,290 | 8/1966 | Diebold | 307/296 |
| 3,386,027 | 5/1968 | Kilgore | 250/209 |
| 3,235,860 | 2/1966 | Vassil | 307/311 |
| 3,355,600 | 11/1967 | Mapham | 307/311 |

OTHER PUBLICATIONS

"Electronics," Power and Control Circuits Dec. 6, 1963 pages 51–60.

Electronics Sept. 14, 1962 pages 42–45 "Semiconductor Modulators for Modern Magnetrons."

*Primary Examiner*—James W. Lawrence
*Assistant Examiner*—Harold A. Dixon
*Attorney*—Misegades & Douglas

EXEMPLARY CLAIM

1. A controlled-rectifier trigger circuit comprising,
 a plurality of controlled rectifiers connected in series across an a.c. source, each controlled rectifier having anode, cathode and gate electrodes,
 a like plurality of radiation-responsive switching devices,
 a capacitor connected to each switching device,
 means connecting a said switching device and a corresponding one of said capacitors between the gate and cathode electrodes of each controlled rectifier,
 a voltage dividing network connected across said source, said network comprising
 a. a series chain of bi-directional or double-clipping zener diodes, three of said zener diodes being associated with each capacitor and two of them having the same operating parameters,
 b. two like-poled uncontrolled rectifiers respectively connected in series with said two zener diodes, and
 c. means connecting each said uncontrolled rectifier, together with its associated zener diode, in parallel with said capacitor, and
 radiation-emitting means for periodically energizing all said radiation-responsive switching devices simultaneously with one another whereby to enable said rectifiers to be triggered by the d.c. voltages developed across their associated capacitors by the voltage dividing network.

3 Claims, 1 Drawing Figure

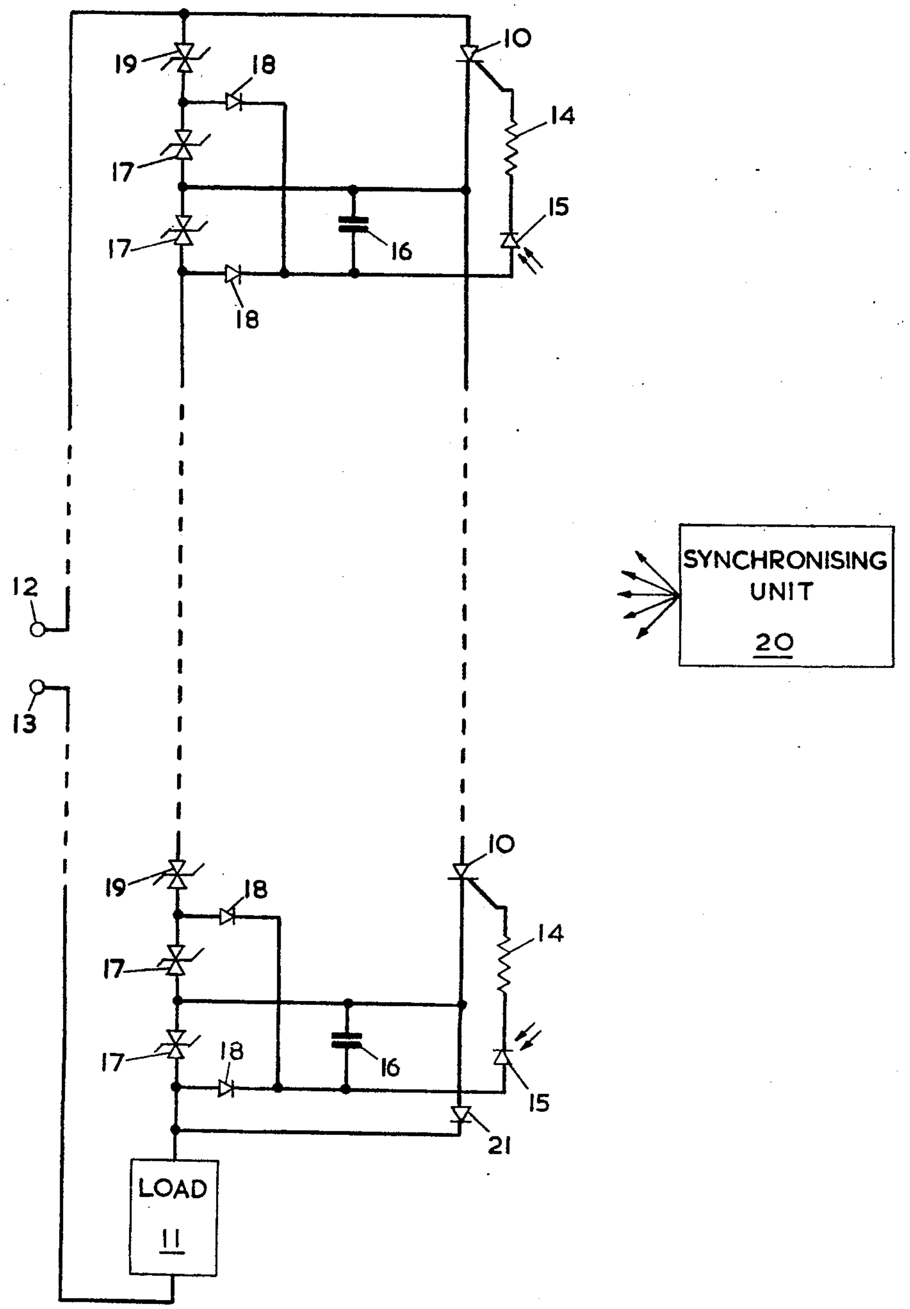
ARNAUD M. ECCLES
NORMAN L. POTTER
INVENTERS
BY Misegades and Douglas
ATTORNEYS

SEMI-CONDUCTOR DEVICES

The invention relates to trigger circuits, and in particular relates to a circuit for triggering a plurality of series-connected controlled rectifiers, e.g. thyristors.

From one aspect, the present invention consists in a circuit for triggering a plurality of series-connected controlled rectifiers, comprising a voltage dividing network connected in parallel with the rectifiers, and a like plurality of auxiliary circuits connected in series with a switching device between the gate and cathode electrodes of each rectifier, said network being adapted to develop a d.c. voltage across each of said circuits, and including means for simultaneously energizing all said switching devices whereby to enable said rectifiers to be triggered by the d.c. voltages developed across their associated auxiliary circuits.

Preferably, the switching devices are responsive to radiation in a predetermined frequency band, the means for energizing the switching devices being adapted periodically to transmit said radiation. Each of the auxiliary circuits may comprise a capacitor, and the voltage divider may conveniently consist of a series chain of double-clipping or bidirectional zener diodes.

A trigger circuit according to the invention will now be described, by way of example, with reference to the accompanying drawing which shows the circuit connections and the controlled rectifiers, e.g. thyristors.

Referring now to the drawing, a plurality of thyristors 10 are connected in series with a direct current load 11 across terminals 12 and 13 of an a.c. supply. Each rectifier has connected between its control electrode and negative pole a series chain comprising a limiting resistor 14, a radiation-controlled semi-conductor device 15, e.g. a photo diode or light-controlled thyristor, and a capacitor 16.

Each capacitor 17 has a charging circuit which includes a pair of series-connected double-clipping zener diodes 17 and, connected to each end of this series connection, a rectifier 18, both the rectifiers 18 being connected to the positive pole of the capacitor 16. The negative pole of the capacitor 16 is connected to the junction between the zener diodes 17, so that these diodes determine the voltage to which the capacitor is charged. Double-clipping zener diodes 19 are also connected in series between adjacent pairs of the zener diodes 17, so that the arrangement forms a voltage dividing circuit which is connected between the terminal 12 and the direct current load 11. By way of explanation, double-clipping or bidirectional zener diodes serve to limit the voltage or both positive- and negative- going signals, so as to enable the circuit to operate over the full range from rectification to inversion.

A synchronizing unit 20 is arranged to emit radiation, for example, visible light, infra-red or X-rays, controlling the devices 15.

A rectifier 21 is connected between the plurality of thyristors 10 and the direct current load 11 in order to ensure that the capacitor 16 associated with the last thyristor in the chain is charged with the correct polarity.

In operation, the terminals 12 and 13 are connected to an a.c. supply and each capacitor 16 is charged through its charging circuit. In response to a radiation control signal from the synchronizing unit 20 all the semi-conductor devices switch to a conducting state simultaneously so as to allow the capacitors 16 to discharge through their associated semi-conductor devices 15 whereby to trigger the thyristors 10 and allow current to flow through the direct current load 11.

It is to be understood that the invention is not limited to the particular arrangement described. For example, the synchronizing unit may alternatively be arranged to provide an electrical pulse signal, instead of a radiation control signal, to each of the devices 15. Furthermore, the voltage dividing circuit may alternatively comprise a pair of capacitors and a resistor instead of a pair of zener diodes 17 and zener diodes 18, respectively.

Whereas a control circuit for a single phase arrangement has been described, it will be appreciated that a group of similar circuits could be arranged together to provide a multi-phase arrangement.

What we claim as our invention and desire to secure by Letters Patent is:

1. A controlled-rectifier trigger circuit comprising,
   a plurality of controlled rectifiers connected in series across an a.c. source, each controlled rectifier having anode, cathode and gate electrodes,
   a like plurality of radiation-responsive switching devices,
   a capacitor connected to each switching device,
   means connecting a said switching device and a corresponding one of said capacitors between the gate and cathode electrodes of each controlled rectifier,
   a voltage dividing network connected across said source, said network comprising
   a. a series chain of bi-directional or double-clipping zener diodes, three of said zener diodes being associated with each capacitor and two of them having the same operating parameters,
   b. two like-poled uncontrolled rectifiers respectively connected in series with said two zener diodes, and
   c. means connecting each said uncontrolled rectifier, together with its associated zener diode, in parallel with said capacitor, and
   radiation-emitting means for periodically energizing all said radiation-responsive switching devices simultaneously with one another whereby to enable said rectifiers to be triggered by the d.c. voltages developed across their associated capacitors by the voltage dividing network.

2. In a chain of series-connected semiconductor controlled rectifiers having a voltage divider connected in parallel to said rectifier chain, each rectifier having a control electrode and at least one main electrode and a firing circuit connected to the control electrode and one of the main electrodes of said rectifier on the one hand and on the other hand to two different points on the voltage divider, said firing circuit comprising means to derive a control voltage from the voltage between said points on the voltage divider and switching means for connecting said control voltage to the control electrode, thereby firing the rectifier, said means to derive a control voltage comprising a rectifying means connected to said points on the voltage divider and a capacitor connected to said rectifying means, said capacitor being also connected to said switching means.

3. A firing circuit according to claim 2, said rectifying means being a full-wave rectifying means having its AC terminals connected to said points of said voltage divider and its DC terminals connected to said capacitor.

* * * * *